(12) United States Patent
Childs et al.

(10) Patent No.: US 12,401,921 B2
(45) Date of Patent: Aug. 26, 2025

(54) DYNAMIC VOLTAGE AND FREQUENCY SCALING FOR IMAGE-SENSOR APPLICATIONS

(71) Applicant: Sony Semiconductor Solutions Corporation, Kanagawa (JP)

(72) Inventors: John Steven Childs, Fairport, NY (US); Mark Pude, Honeoye Falls, NY (US); Hirotaka Murakami, Santa Clara, CA (US); Robert James Childs, Victor, NY (US); Cody Cziesler, Fairport, NY (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 141 days.

(21) Appl. No.: 18/556,482

(22) PCT Filed: Apr. 22, 2022

(86) PCT No.: PCT/US2022/025899
§ 371 (c)(1),
(2) Date: Oct. 20, 2023

(87) PCT Pub. No.: WO2022/231961
PCT Pub. Date: Nov. 3, 2022

(65) Prior Publication Data
US 2024/0196113 A1 Jun. 13, 2024

Related U.S. Application Data

(60) Provisional application No. 63/180,015, filed on Apr. 26, 2021.

(51) Int. Cl.
*H04N 25/709* (2023.01)
*G06F 1/08* (2006.01)
(Continued)

(52) U.S. Cl.
CPC ............. *H04N 25/709* (2023.01); *G06F 1/08* (2013.01); *H04N 25/75* (2023.01); *H04N 25/7795* (2023.01)

(58) Field of Classification Search
CPC .. H04N 25/709; H04N 25/75; H04N 25/7795; G06F 1/08; G06F 1/324; G06F 1/325; G06F 1/3296
See application file for complete search history.

(56) References Cited

U.S. PATENT DOCUMENTS 11,134,189 B2 * 9/2021 Jeong ....................... H03L 7/18
2007/0206018 A1 9/2007 Bajic et al.
(Continued)

OTHER PUBLICATIONS

International Search Report and Written Opinion dated Jul. 28, 2022 for corresponding International Application No. PCT/US22/025899.

*Primary Examiner* — Nicholas G Giles
(74) *Attorney, Agent, or Firm* — Michael Best & Friedrich LLP

(57) ABSTRACT

An imaging device having a digital circuit block therein subjected to in-frame DVFS during a frame sequence of the sensing operating mode. In an example embodiment, the in-frame DVFS causes a higher power-supply voltage and a higher clock frequency to be supplied to the digital circuit block during read periods of the frame sequence, and a lower power-supply voltage and a lower clock frequency to be supplied to the digital circuit block during V-blanking periods of the frame sequence. The lower power-supply voltage and clock frequency are selected to be sufficient for the digital circuit block to support the pertinent functions thereof during the V-blanking periods without adversely impacting performance. For example, the lower power-supply voltage is sufficient for a SRAM of the digital circuit block to retain data therein. Beneficially, the in-frame DVFS
(Continued)

enables the imaging device to perform motion detection while consuming very little power.

20 Claims, 5 Drawing Sheets

(51) Int. Cl.
*H04N 25/75* (2023.01)
*H04N 25/76* (2023.01)

(56) References Cited

U.S. PATENT DOCUMENTS

| | | |
|---|---|---|
| 2010/0321516 A1 | 12/2010 | Kashiwagi et al. |
| 2014/0184619 A1 | 7/2014 | Kim |
| 2015/0317762 A1 | 11/2015 | Park |
| 2018/0300838 A1 | 10/2018 | Park |
| 2020/0396378 A1* | 12/2020 | Jeong ................ H03L 7/08 |

\* cited by examiner

DYNAMIC VOLTAGE AND FREQUENCY SCALING FOR IMAGE-SENSOR APPLICATIONS

CROSS REFERENCE TO RELATED APPLICATIONS

This application is a 371 National Stage Entry of International Application No.: PCT/US2022/025899, filed on Apr. 22, 2022, which claims the benefit of U.S. Provisional Patent Application No. 63/180,015, filed Apr. 26, 2021, and entitled "In-frame Dynamic Voltage Scaling (DVS) and Dynamic Frequency Scaling (DFS) for CMOS Image Sensor Applications," which is incorporated herein by reference in its entirety.

BACKGROUND

Field

Various example embodiments relate to image sensors and, more specifically but not exclusively, to methods and apparatus for reducing power consumption in image sensors.

Description of the Related Art

This section introduces aspects that may help facilitate a better understanding of the disclosure. Accordingly, the statements of this section are to be read in this light and are not to be understood as admissions about what is in the prior art or what is not in the prior art.

Image sensors are used in various electronic imaging devices and systems, such as digital cameras, smartphones, medical imaging equipment, machine vision equipment, and so on. Two main types of image sensors used in such imaging devices are the charge-coupled-device (CCD) sensors and the complementary metal-oxide-semiconductor (CMOS) sensors. In addition to the primary task of light collection, CMOS image sensors may typically provide several processing and/or control functions directly in the sensor's integrated circuit (IC) and/or IC assembly. For example, some CMOS sensors may have a power-management functionality to reduce power consumption in some operating modes.

SUMMARY OF SOME SPECIFIC EMBODIMENTS

Disclosed herein are various embodiments of an imaging device having a digital circuit block therein subjected to in-frame dynamic voltage and frequency scaling (DVFS) during a frame sequence of the sensing operating mode. In an example embodiment, the in-frame DVFS causes a higher power-supply voltage and a higher clock frequency to be supplied to the digital circuit block during read periods of the frame sequence, and a lower power-supply voltage and a lower clock frequency to be supplied to the digital circuit block during V-blanking periods of the frame sequence. The lower power-supply voltage and clock frequency are selected to be sufficient for the digital circuit block to support the pertinent functions thereof during the V-blanking periods without adversely impacting performance. For example, the lower power-supply voltage is sufficient for a static random-access memory (SRAM) of the digital circuit block to retain data therein. Beneficially, the disclosed in-frame DVFS enables the imaging device to perform motion detection while consuming very little power, e.g., approximately 100 µW at the frame rate of 1 fps in some embodiments.

Some embodiments may employ one of in-frame DFS and in-frame DVS but not both.

According to an example embodiment, provided is an apparatus, comprising an imaging device that comprises: an electronic controller configured to control one-frame operation of the imaging device in response to a host command, the one-frame operation including at least a read period and a V-blanking period; and a power-supply regulator configured to selectively supply a first non-zero voltage and a second non-zero voltage to a digital circuit block of the imaging device; and wherein the imaging device is configured to subject the digital circuit block to dynamic voltage scaling within the one-frame operation such that the first non-zero voltage is supplied to the digital circuit block during the read period, and the second non-zero voltage is supplied to the digital circuit block during the V-blanking period.

According to another example embodiment, provided is an apparatus, comprising an imaging device that comprises: an electronic controller configured to control one-frame operation of the imaging device in response to a host command, the one-frame operation including at least a read period and a V-blanking period; one or more oscillators configured to supply a selected one of a first clock frequency and a second clock frequency to a digital circuit block of the imaging device; and wherein the imaging device is configured to subject the digital circuit block to dynamic frequency scaling within the one-frame operation such that the first clock frequency is supplied to the digital circuit block during the read period, and the second clock frequency is supplied to the digital circuit block during the V-blanking period.

According to yet another example embodiment, provided is a method implemented in an imaging device, the method comprising: controlling, with an electronic controller, one-frame operation of the imaging device in response to a host command, the one-frame operation including at least a read period and a V-blanking period; selectively supplying, with a power-supply regulator, a first non-zero voltage and a second non-zero voltage to a digital circuit block of the imaging device; supplying, with one or more oscillators, a selected one of a first clock frequency and a second clock frequency to the digital circuit block; and subjecting the digital circuit block to dynamic voltage and frequency scaling (DVFS) within the one-frame operation, said DVFS comprising supplying the first non-zero voltage and the first clock frequency to the digital circuit block during the read period, and supplying the second non-zero voltage and the second clock frequency to the digital circuit block during the V-blanking period.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
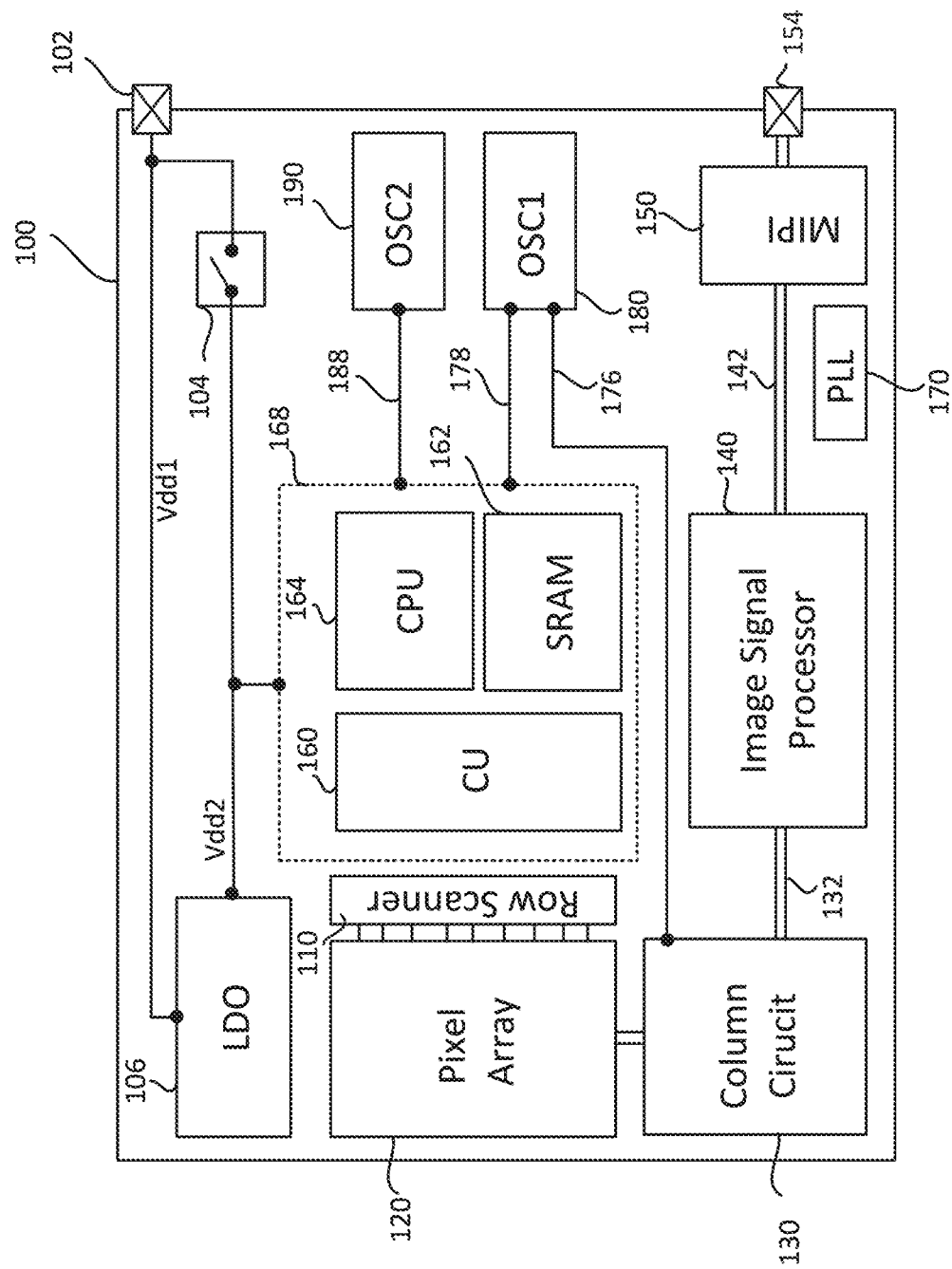
FIG. 1 is a block diagram illustrating an imaging device according to an example embodiment.

Dynamic frequency scaling (DFS) is a technique for saving power by dynamically changing a clock frequency depending on an operating mode to prevent circuitry from operating at a non-optimally high clock frequency. Unlike clock gating, which involves ON/OFF switching of a clock, DFS involves raising and/or lowering a clock frequency. Various circuit-implemented methods can be used to change the clock frequency. For example, in some embodiments, the clock frequency can be changed by changing an output frequency of an oscillator that generates the clock signal. For example, in some embodiments, the clock frequency can be changed by providing, downstream from the corresponding oscillator, a configurable frequency divider capable of varying its frequency-division factor. In some other embodiments, the clock frequency can be changed by providing a plurality of oscillators that differ from one another in oscillation frequency and switching between the clock outputs obtained from those oscillators to select any of the clock frequencies thereof. As used herein, the term "oscillator" may refer to an electrical oscillator that receives an input of a reference clock, e.g., as is the case with a phase locked loop (PLL), or to an electrical oscillator that performs oscillation on its own.

Dynamic voltage scaling (DVS) is a technique that may be combined with DFS to achieve a higher-voltage operation when the clock frequency is high, and a lower-voltage operation when the clock frequency is low. Unlike power gating, which involves power ON/OFF switching, DVS involves changing a voltage between different non-zero values thereof. A combined use of DFS and DVS makes it possible to save more power than the use of DFS alone. The combined use of DFS and DVS may be referred to as dynamic voltage and frequency scaling (DVFS).

According to an example embodiment, the power consumed by a CMOS image sensor (CIS) in a sensing mode and/or in a viewing mode, in which an image size is small, may be reduced using the application of DVS and DFS within one-frame operation (hereinafter collectively referred to as "in-frame DVFS"). As used herein, the term "sensing mode" may refer to a CIS operating mode in which motion detection is performed continuously within a stream of image frames of a relatively small size, e.g., 32×10 (mono). The term "viewing mode" may refer to a CIS operating mode in which image data of a larger size, e.g., 320×120 (color) or greater, are outputted from a mobile industry processor interface (MIPI) block of the CIS. A change of the image data size may be achieved, e.g., by changing the binning mode of the physical pixel array.

One-frame operation in a CIS may typically include the following periods (1) to (4):

(1) a shutter period: resetting photodiodes in pixels;
(2) an integration (or exposure) period: optical-to-electrical (O/E) conversion in photodiodes;
(3) a read period: analog-to-digital (A/D) conversion of electric charges generated by the photodiodes during the O/E conversion; and
(4) a V-blanking period: waiting time until the shutter period of the next frame in the frame sequence.

When the image size is small (e.g., the VGA image size or smaller) in the sensing or viewing mode, or when the frame rate is low, the periods (1) and (3) may be relatively short. As a result, the V-blanking period (4) may account for most of the time of one frame. Thus, reduction in the power consumption during the V-blanking period (4) may typically result in a concomitantly reduced overall power consumption for the CIS.

One pertinent function to be achieved in the V-blanking period (4) is to simply wait for the start timing of the next frame. To fulfil this function in the V-blanking period (4), it may be sufficient to operate selective blocks of the CIS by supplying low-frequency clock signals thereto. For a rolling-shutter CIS with a short exposure time, the read operation on the first line of the pixel array may start before the shuttering operation on the last line completes, in some cases. Thus, a separate integration period (2) may be absent in some cases. Herein, the integration period (2) refers to, rather than the exposure time of each pixel, a period regarding an operational state of the sensor that is the waiting time from the completion of the shuttering operations for all pixels to the start of the read operation.

In cases in which a small-size image and low-accuracy analog-to-digital conversion are allowable, such as in the sensing mode, the shutter period (1) and the read period (3) may be relatively short. In such cases, the time duration of the integration period (2) may be relatively significant. An important function to be achieved in the integration period (2) is to wait until the corresponding read period (3) starts. Thus, similar to the V-blanking period (4), the integration period (2) may be amenable to low-power operations, with selected blocks being operated while being supplied with low-frequency clocks, in some cases.

FIG. 1 is a block diagram illustrating an imaging device 100 according to an example embodiment. Image device 100 comprises a row scanner 110, a pixel array 120, and a column circuit 130. The output of column circuit 130 is directed, via a bus 132, to an image-signal processor 140. The processed signals generated by image-signal processor 140 are further directed, via a bus 142, to a MIPI block 150 connected to an output port 154 of imaging device 100. Output port 154 may further be connected to an application processor (not explicitly shown in FIG. 1; see 440, FIG. 4). In operation, MIPI block 150 may transmit the image data received from image-signal processor 140, via output port 154, to the application processor in accordance with the MIPI protocol.

In an example embodiment, processor 140 may include a SIF block and a DU block (not explicitly shown in FIG. 1). The SIF block is an interface that receives the image data from column circuit 130 and outputs the image data to the DU block. The DU block performs predetermined image processing on the received image data and outputs the resultant image data to MIPI block 150.

Pixel array 120 comprises a plurality of pixels (not explicitly shown in FIG. 1) arranged in a two-dimensional matrix array, wherein individual pixels are typically arranged in mutually orthogonal rows and columns. In an example embodiment, pixel array 120 may have a size in which the pixels are arranged in 1280 columns and 720 rows. In other embodiments, other array sizes may also be used. In some embodiments, each of the pixels may include two or more respective subpixels (not explicitly shown in FIG. 1), e.g., to enable the capture of color images and/or implementation of other desired imaging functions. The rows and columns may sometimes be referred to as horizontal (H) elements and vertical (V) elements, respectively, of the CIS.

Each row of pixels of pixel array 120 is connected to row scanner 110 via a respective row-signal line. Each column of pixels of pixel array 120 is connected to column circuit 130 via a respective column-signal (V) line. In an example embodiment, column circuit 130 may include an amplifier circuit and an analog-to-digital converter (ADC) circuit (not explicitly shown in FIG. 1).

In operation, individual pixels of pixel array 120 may generate electric charges in response to received light. Row scanner 110 may apply drive signals (e.g., voltages) to the pixels to enable the pixels to properly flush and accumulate the charges and sequentially output the corresponding electrical signals to column circuit 130 via respective column-signal lines. Column circuit 130 may typically include a current source connectable to the selected column-signal line(s) to enable proper pixel-signal readout from the corresponding pixels. The pixel signals may typically be amplified in the amplifier circuit, converted into digital form in the ADC circuit, and may be directed, by way of bus 132, to image-signal processor 140.

Imaging device 100 further comprises a control unit (CU) circuit block 160, a static random-access memory (SRAM) 162, a central processing unit (CPU) 164, a PLL 170, and oscillators 180 and 190. CU block 160 and CPU 164 operate to control row scanner 110, pixel array 120, and column circuit 130 based on commands and data received from the above-mentioned application processor. CU block 160 operates to generate appropriate control signals for row scanner 110, pixel array 120, and column circuit 130 based on the input received from CPU 164 and possibly additional inputs from the application processor. For example, the control signals generated in this manner by CU block 160 may control the start timing and the end timing of each operational state, such as the above-mentioned shutter period (1), integration period (2), read period (3), and V-blanking period (4). SRAM 162 is a memory accessible to both CU block 160 and CPU 164, which is used thereby to support intended control operations.

PLL 170 and oscillators 180 and 190 operate to generate clock signals used by various circuits of imaging device 100. For example, oscillator 190 operates to generate a clock signal 188 for a digital circuit block or power domain 168, which includes, inter alia, CU block 160, CPU 164, and SRAM 162. Oscillator 180 operates to generate clock signals 176 and 178 for column circuit 130 and digital circuit block 168, respectively. The clock outputs of oscillators 180 and 190 may typically be controlled by CU block 160.

Figure 4:
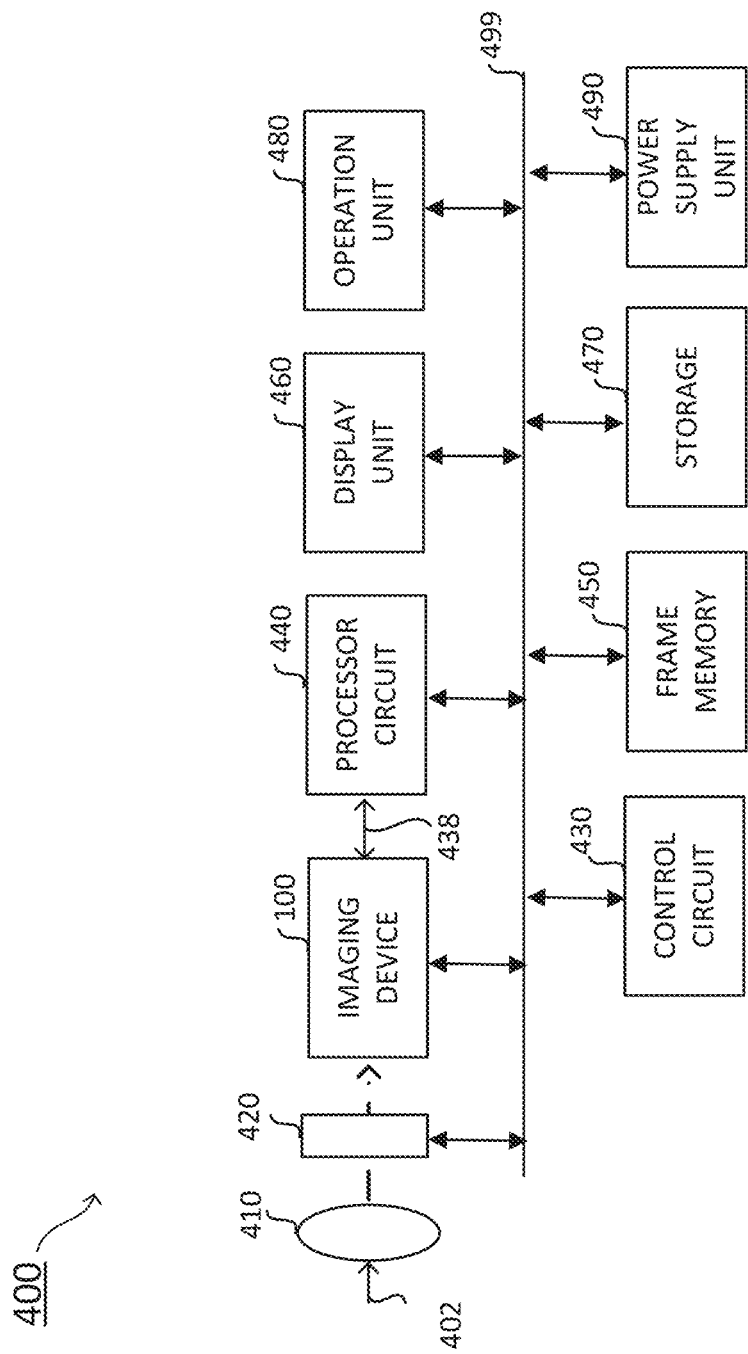
FIG. 4 is a block diagram illustrating an example configuration of an imaging system including the imaging device of FIG. 1 according to various embodiments.

Imaging device 100 further comprises a power-supply terminal 102 connected to an external power supply (not explicitly shown in FIG. 1; see 490, FIG. 4). In operation, terminal 102 receives, from the external power supply, a power supply voltage Vdd1 (e.g., 1.05 V), which may then be distributed to different parts of imaging device 100. For example, connected to a Vdd1 power supply line are a power gate 104 and a low-dropout (LDO) regulator 106. LDO regulator 106 includes a circuit that stably outputs a voltage Vdd2 (e.g., 0.80 V) that is lower than the power supply voltage Vdd1. A Vdd2 power supply line, to which LDO regulator 106 applies the voltage Vdd2, is connected to at least digital circuit block 168. Power gate 104 can be closed or opened, thereby causing digital circuit block 168 to receive the power supply voltage Vdd1 from the external power supply or the voltage Vdd2 from LDO regulator 106. Power gate 104 can be closed or opened under the control of CU block 160, for example.

SRAM 162 typically needs the power supply voltage Vdd1 to be able to perform normally Data Read and Data Write operations therein, with the voltage Vdd2 being insufficient for the SRAM to perform the Data Read and Data Write operations normally. However, the voltage Vdd2 is still sufficient for SRAM 162 to perform a Data Retention operation, i.e., an operation of holding the data therein without performing Data Read or Data Write operations and without losing the data.

Figure 2:
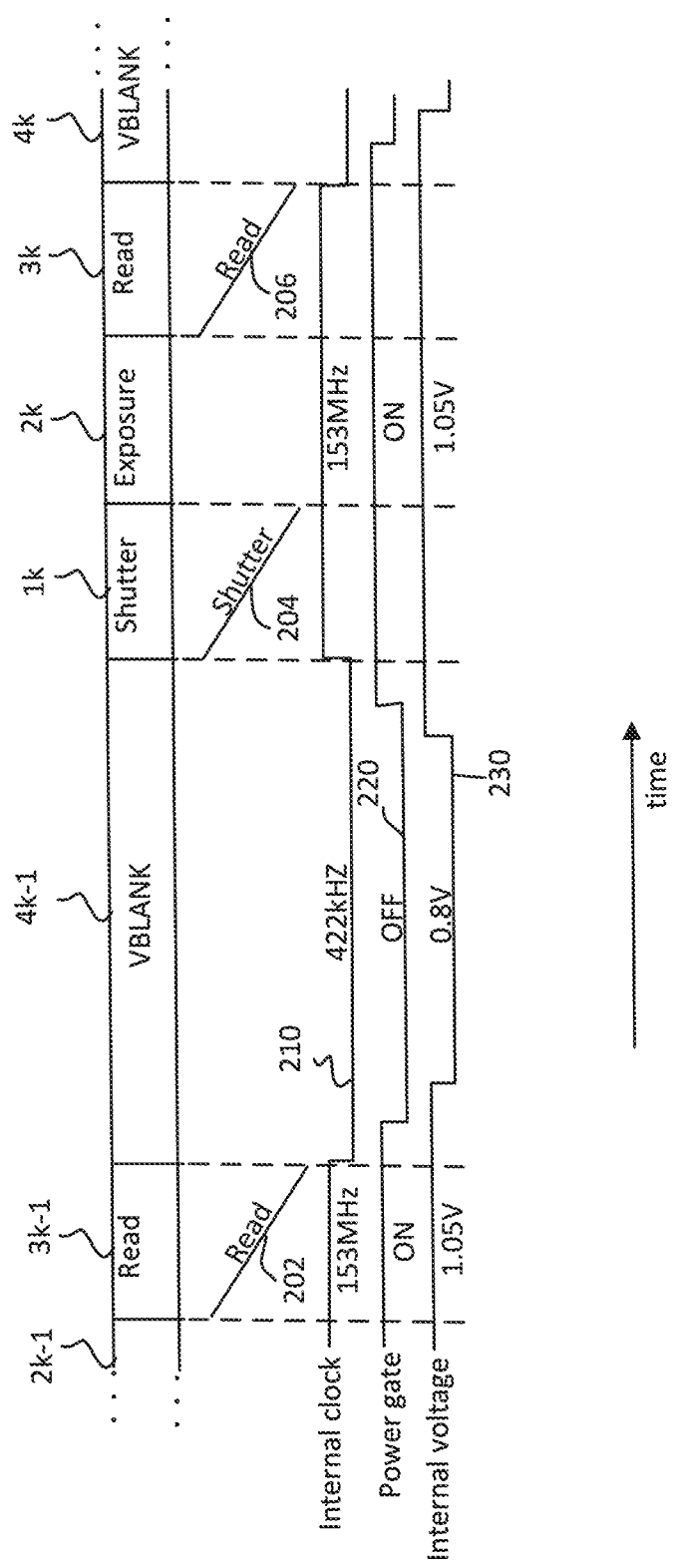
FIG. 2 is a time diagram illustrating example one-frame operation in a sensing mode of the imaging device of FIG. 1 according to an embodiment.

FIG. 2 is a time diagram illustrating example one-frame operation in a sensing operating mode of imaging device 100 according to an embodiment. The shown one-frame operation implement in-frame DVFS as explained in more detail below. The illustrated embodiment corresponds to the following circuit parameters: (i) the voltage Vdd1 is 1.05 V; (ii) the voltage Vdd2 is 0.8 V; (iii) the frequency of clock signal 176 is 612 MHz; (iv) the frequency of clock signal 178 is 153 MHz; and (v) the frequency of clock signal 188 is 422 kHz (also see FIG. 1). In other embodiments, other circuit parameters may also be used. For example, other clock frequencies may be used for clock signals 176, 178, 188. Other voltages may be used as the voltages Vdd1 and Vdd2.

The time interval shown in FIG. 2 corresponds to two consecutive frames in the sensing mode, illustratively the (k−1)-th frame and the k-th frame, and includes the following frame periods: an exposure period $2_{k-1}$ of the (k−1)-th frame; a read period $3_{k-1}$ of the (k−1)-th frame; a V-blanking period $4_{k-1}$ of the (k−1)-th frame; a shutter period $1_k$ of the k-th frame; an exposure period $2_k$ of the k-th frame; a read period $3_k$ of the k-th frame; and a V-blanking period $4_k$ of the k-th frame. A sloped line 202 during the read period $3_{k-1}$ of the (k−1)-th frame represents the row sequence in which the pixel charges are read out in pixel array 120. A sloped line 204 during the shutter period $1_k$ of the k-th frame represents the row sequence in which the pixel photodiodes are reset in pixel array 120. A sloped line 206 during the read period $3_k$ of the k-th is analogous to the sloped line 202.

In FIG. 2, a trace 210 shows the time dependence of the internal-clock frequency of digital circuit block 168. This frequency is 153 MHz during frame periods $2_{k-1}$, $3_{k-1}$, $1_k$, $2_k$, and $3_k$. This frequency is 422 kHz during frame periods $4_{k-1}$ and $4_k$. The changes of the frequency are implemented by switching the internal clock signal between clock signals 178 and 188. For example, to have the internal clock frequency of 153 MHz, clock signal 178 is selected. To have the internal clock frequency of 422 kHz, clock signal 188 is selected. To achieve additional power savings during the V-blanking frame periods, such as the periods $4_{k-1}$ and $4_k$, oscillator 180 may be stopped, which stops both clock signals 176 and 178. In an example embodiment, clock signals 176 and 178 may be derived from a common reference oscillator by dividing the reference clock frequency by different respective division factors. In the shown example, the frequency of clock signal 178 is lower than the frequency of clock signal 176 by a factor of four, i.e., 612 MHz/153 MHz=4.

In FIG. 2, a trace 220 shows the state of power gate 104 as a function of time. A trace 230 shows the time dependence of the internal power-supply voltage in digital circuit block 168. When power gate 104 is in the ON state, digital circuit block 168 is connected to the Vdd1 power supply line, which results in the power supply voltage of 1.05 V during the frame periods $2_{k-1}$, $3_{k-1}$, $1_k$, $2_k$, and $3_k$. When power gate 104 is turned OFF, digital circuit block 168 receives a reduced power-supply voltage of 0.8 V during the V-blanking frame periods $4_{k-1}$ and $4_k$. Note that during the sequence (1)-(4) of one-frame operation, both the internal clock-signal frequency and power-supply voltage of circuit block 168 are being changed, which is a manifestation of in-frame DVFS.

Figure 3A:
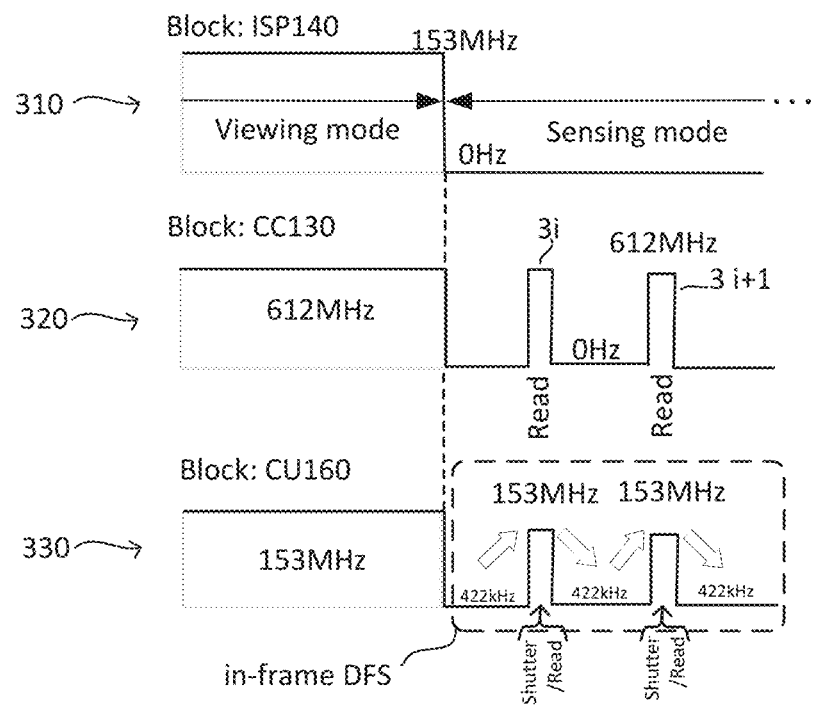
FIGS. 3A-3B show time diagrams illustrating concurrent power-saving operations in different circuits of the imaging device of FIG. 1 according to an embodiment.
Figure 3B:
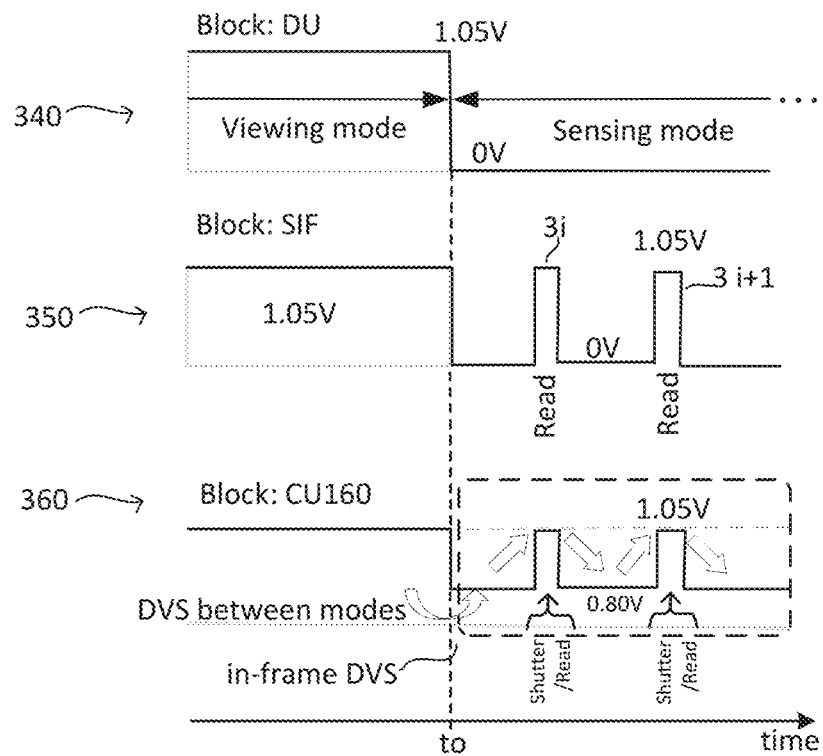

FIGS. 3A-3B show time diagrams illustrating concurrent power-saving operations in different circuits of imaging device 100 according to an embodiment. More specifically, FIG. 3A shows time diagrams illustrating, for selected circuits of imaging device 100, the clock-frequency changes. FIG. 3B similarly shows time diagrams illustrating, for selected circuits of imaging device 100, the power-supply voltage changes. Each of the time diagrams covers a transition, at time to, between the viewing mode and the sensing mode of imaging device 100.

Referring to FIG. 3A, traces 310, 320, and 330 illustrate the time dependence of internal clock frequencies for image-signal processor (ISP) 140, column circuit (CC) 130, and CU block 160, respectively. The internal clock of image-signal processor 140 is at 153 MHz in the viewing mode and is stopped in the sensing mode as indicated by trace 310. As such, trace 310 indicates that clock gating is applied between the viewing and sensing modes in image-signal processor 140. The internal clock of column circuit 130 is at 612 MHz in the viewing mode and is gated in the sensing mode as indicated by trace 320. More specifically, for the frame read periods $3_i$ and $3_{i+1}$ of the sensing mode, the internal clock of column circuit 130 is at 612 MHz, i.e., at the same frequency as during the viewing period. For the other frame periods, the internal clock of column circuit 130 is stopped. As such, trace 320 indicates that clock gating is applied between viewing and sensing modes and within the sensing mode in column circuit 130. The internal clock of CU block 160 is at 153 MHz in the viewing mode and is subjected to in-frame DFS within the sensing mode as indicated by trace 330 (also see 210, FIG. 2). As such, trace 330 indicates that DFS is applied between viewing and sensing modes and within the sensing mode in CU block 160.

Referring to FIG. 3B, traces 340, 350, and 360 illustrate the time dependence of power-supply voltages for the DU block of image-signal processor 140, the SIF block of image-signal processor 140, and CU block 160, respectively. The power-supply voltage for image-signal processor 140 is at 1.05 V in the viewing mode and is at 0 V (e.g., disconnected from the power supply) in the sensing mode as indicated by trace 340. As such, trace 340 indicates that power gating is applied between viewing and sensing modes in the DU block of image-signal processor 140. The power-supply voltage for the SIF block is at 1.05 V in the viewing mode and is gated in the sensing mode as indicated by trace 350. More specifically, for the frame read periods $3_i$ and $3_{i+1}$ of the sensing mode, the power-supply voltage for the SIF block is at 1.05 V, i.e., at the same level as during the viewing period. For the other frame periods, the power-supply voltage for the SIF block is turned OFF. As such, trace 350 indicates that power gating is applied between viewing and sensing modes and within the sensing mode in the SIF block. The power-supply voltage for CU block 160 is at 1.05 V in the viewing mode and is subjected to in-frame DVS within the sensing mode as indicated by trace 360 (also see 230, FIG. 2). As such, trace 360 indicates that DVS is applied between viewing and sensing modes and within the sensing mode in CU block 160.

Imaging device 100 according to various embodiments and modification examples may be used to implement a variety of imaging systems, such as digital still cameras or video cameras, portable devices with imaging functions, and various electronic apparatus including imaging elements in their image capturing units, e.g., copy machines including imaging elements in their image reading units. Furthermore, example embodiments may also be applicable to robots, drones, automobiles, medical equipment (e.g., endoscopes), or other systems that include imaging device 100 or an equivalent thereof. In different embodiments, imaging device 100 may be formed into one chip or into a packaged module including an imaging unit and a signal processor or an optical system with an imaging function. An example imaging system including imaging device 100 according to any of the embodiments and modification examples described above is further described with reference to FIG. 4.

FIG. 4 is a block diagram illustrating an example configuration of an imaging system 400 including imaging device 100 according to example embodiments and modifications described above. As shown, imaging system 400 includes, for example, a suitable embodiment of imaging device 100, optics 410, a shutter device 420, a control circuit 430, a processor circuit 440, a frame memory 450, a display unit 460, a data storage 470, an operation unit 480, and a power supply unit 490. Different components of system 400 are coupled to each other via a bus 499. Processor circuit 440 represents a specific but non-limiting example of the above-mentioned application processor.

Optics 410 may include one or more lenses. In operation, optics 410 guides an incident light beam 402 (e.g., received from an object or scene) to imaging device 100 to focus the light on a light receiving surface of pixel array 120. Shutter device 420 is disposed between optics 410 and imaging device 100 and operates to control the light-exposure time period and the light-shielding time period with respect to imaging device 100 under the control of control circuit 430. Imaging device 100 accumulates light-generated charges for a certain period of time, which may depend on the light focused on the light receiving surface of pixel array 120 through optics 410 and the state of shutter device 420. The light-generated charges are transferred, e.g., as pixel signals (image data), to processor circuit 440 on the basis of a control signal supplied from control circuit 430.

Processor circuit 440 and imaging device 100 may exchange control signals via a control line 438 and exchange data via bus 499. Processor circuit 440 may process the pixel signal (image data) outputted from imaging device 100. Frame memory 450 may temporarily hold the image data that are being processed by processor circuit 440 on a frame-unit basis. Display unit 460 may be, for example, a display panel, such as a liquid-crystal panel or an organic electroluminescent (EL) panel. Display unit 460 may display a moving image or a still image, depending on the type of images captured by imaging device 100. Data storage 470 may record the image data of the moving or still image on a recording medium, such as a semiconductor memory or a magnetic hard disk. Operation unit 480 may issue operation commands for various functions of imaging system 400 in accordance with operations requested by the user. Power-supply unit 490 operates to supply different components of system 400 with electric power as appropriate. For example, power-supply unit 490 may be connected to supply the power supply voltage Vdd1 to power terminal 102 of imaging device 100 (also see FIG. 1).

Figure 5:
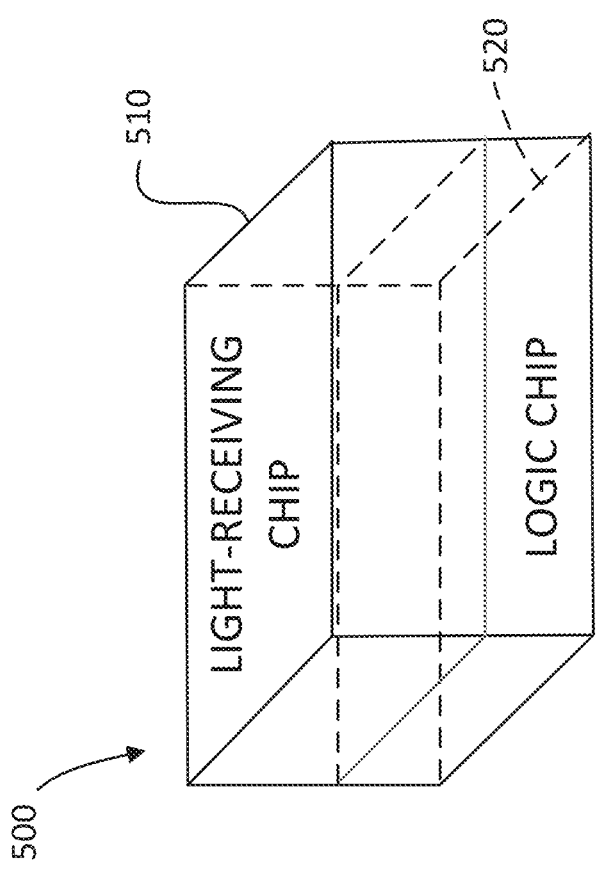
FIG. 5 shows a simplified three-dimensional perspective view of an IC assembly that can be used in the imaging device of FIG. 1 according to an embodiment.

FIG. 5 shows a simplified three-dimensional perspective view of an IC assembly 500 that can be used in imaging device 100 according to an embodiment. Assembly 500 comprises a light-receiving chip 510 and a logic chip 520 arranged in a vertical stack, as indicated in FIG. 5.

As used herein, the term "stack" refers to an orderly arrangement of packaged or non-packaged dies in which main planes of the stacked dies face and are near each other. The facing dies or chips may be electrically connected, e.g., using patterned conducting (such as metal) layers, ball-grid arrays, solder bumps, wire bonds, etc. In some such embodiments, the dies or chips of a stack can be mounted on a mechanical carrier in an orientation in which the main planes of the stacked dies are parallel to each other and/or to the main plane of the mechanical carrier. In some such embodiments, one of the dies or chips of the stack may function as the mechanical carrier. In some embodiments, individual ICs of the stack may include any combination of one or more respective substrates, one or more redistribution layers (RDLs), one or more interposers, one or more laminate plates, etc.

Herein, a "main plane" of an object, such as a die, a substrate, or an IC, is a plane parallel to a substantially planar surface thereof that has about the largest area among exterior surfaces of the object. This substantially planar surface may be referred to as a main surface. The exterior surfaces of the object that have one relatively large size, e.g., length, but are of much smaller area, e.g., less than one half of the main-surface area, are typically referred to as the edges of the object.

In some embodiments, chips 510 and 520 may be flip-chip bonded using direct joining, in which the facing surfaces of the chips are planarized, and the chips are laminated together to form assembly 500. In some other embodiments, chips 510 and 520 may be flip-chip bonded using Cu-to-Cu joining, in which copper (Cu) pads formed on the facing surfaces of the chips are bonded to provide electrical connections between the chips in assembly 500. In some alternative embodiments, other suitable chip-stacking techniques may also be used.

In an example embodiment, light-receiving chip 510 may include pixel array 120, e.g., a 2560×1920 pixel array. Logic chip 520 may include some or all of: power gate 104, LDO regulator 106, row scanner 110, column circuit 130, processor 140, MIPI block 150, CU block 160, SRAM 162, CPU 164, a PLL 170, and oscillators 180 and 190. In other embodiments, other suitable partitions of imaging device 100 among two or more different ICs of the corresponding IC assembly are also possible.

According to an example embodiment disclosed above, e.g., in the summary section and/or in reference to any one or any combination of some or all of FIGS. 1-5, provided is an apparatus comprising an imaging device (e.g., 100, FIG. 1) that comprises: an electronic controller configured to control one-frame operation (e.g., $1_k$, $2_k$, $3_k$, $4_k$, FIG. 2) of the imaging device in response to a host command (e.g., 438, FIG. 4), the one-frame operation including at least a read period and a V-blanking period; and a power-supply regulator (e.g., 104, 106, FIG. 1) configured to selectively supply a first non-zero voltage (e.g., Vdd1, FIG. 1) and a second non-zero voltage (e.g., Vdd2, FIG. 1) to a digital circuit block (e.g., 168, FIG. 1) of the imaging device; and wherein the imaging device is configured to subject the digital circuit block to dynamic voltage scaling within the one-frame operation such that the first non-zero voltage is supplied to the digital circuit block during the read period, and the second non-zero voltage is supplied to the digital circuit block during the V-blanking period (e.g., as shown in FIG. 2).

In some embodiments of the above apparatus, the power-supply regulator comprises a low-dropout regulator (e.g., 106, FIG. 1) and a power gate (e.g., 104, FIG. 1) connected in parallel to each other between a power-supply terminal (e.g., 102, FIG. 1) of the imaging device and the digital circuit block.

In some embodiments of any of the above apparatus, the power-supply regulator is configured to cause an absolute value of the second non-zero voltage to be smaller than an absolute value of the first non-zero voltage (e.g., Vdd2=0.8 V<Vdd1=1.05 V).

In some embodiments of any of the above apparatus, the digital circuit block includes a static random-access memory (SRAM) (e.g., 162, FIG. 1); and wherein the second non-zero voltage enables the SRAM to perform a data retention operation therein.

In some embodiments of any of the above apparatus, the second non-zero voltage is insufficient for the SRAM to perform a data read operation or a data write operation therein.

In some embodiments of any of the above apparatus, the apparatus further comprises one or more oscillators (e.g., 180, 190, FIG. 1) configured to supply a selected one of a first clock frequency (e.g., 178, FIG. 1) and a second clock frequency (e.g., 188, FIG. 1) to the digital circuit block; and wherein the imaging device is further configured to subject the digital circuit block to dynamic frequency scaling within the one-frame operation such that the first clock frequency is supplied to the digital circuit block during the read period, and the second clock frequency is supplied to the digital circuit block during the V-blanking period (e.g., as shown in FIG. 2).

In some embodiments of any of the above apparatus, the one-frame operation includes a shutter period; and wherein the dynamic voltage scaling and the dynamic frequency scaling within the one-frame operation are configured to cause the first non-zero voltage and the first clock frequency to be supplied to the digital circuit block during the shutter period (e.g., as shown in FIG. 2).

In some embodiments of any of the above apparatus, the one-frame operation includes an exposure period; and wherein the dynamic voltage scaling and the dynamic frequency scaling within the one-frame operation are configured to cause the first non-zero voltage and the first clock frequency to be supplied to the digital circuit block during the exposure period (e.g., as shown in FIG. 2).

In some embodiments of any of the above apparatus, the one or more oscillators are configured to stop generating the first clock frequency during the V-blanking period.

In some embodiments of any of the above apparatus, a ratio of the first clock frequency and the second clock frequency is larger than 300.

In some embodiments of any of the above apparatus, the imaging device is configurable to operate in a selected one of a plurality of operating modes including a first mode (e.g., Sensing Mode, FIGS. 3A-3B) and a different second mode (e.g., Viewing Mode, FIGS. 3A-3B), the first mode including a sequence of one-frame operations.

In some embodiments of any of the above apparatus, the power-supply regulator is configured to continuously supply the first non-zero voltage to the digital circuit block during the second mode (e.g., 360, FIG. 3B).

In some embodiments of any of the above apparatus, the one or more oscillators are configured to continuously supply the first clock frequency to the digital circuit block during the second mode (e.g., 330, FIG. 3A).

In some embodiments of any of the above apparatus, the one or more oscillators are configured to continuously supply the first clock frequency to the digital circuit block during the second mode (e.g., 330, FIG. 3A).

In some embodiments of any of the above apparatus, the imaging device further comprises a pixel array (e.g., 120, FIG. 1) and an analog-to-digital-converter (ADC) circuit (e.g., 130, FIG. 1) connected to the pixel array; and wherein the one or more oscillators are configured to supply a third clock frequency (e.g., 176, FIG. 1) to the ADC circuit (e.g., 130, FIG. 1), the third clock frequency being greater than the first clock frequency.

In some embodiments of any of the above apparatus, the third clock frequency is an integer multiple of the first frequency (e.g., 612 MHz/153 MHz=4).

In some embodiments of any of the above apparatus, the one or more oscillators are configured to: supply the third clock frequency to the ADC circuit during the read period (e.g., 320, $3_i$, FIG. 3A); and stop generating the third clock frequency during the V-blanking period (e.g., 320, between $3_i$ and $3_{i+1}$, FIG. 3A).

In some embodiments of any of the above apparatus, the electronic controller includes the digital circuit block.

According to another example embodiment disclosed above, e.g., in the summary section and/or in reference to any one or any combination of some or all of FIGS. 1-5, provided is an apparatus comprising an imaging device (e.g., 100, FIG. 1) that comprises: an electronic controller configured to control one-frame operation (e.g., $1_k$, $2_k$, $3_k$, $4_k$, FIG. 2) of the imaging device in response to a host command (e.g., 438, FIG. 4), the one-frame operation including at least a read period and a V-blanking period; one or more oscillators (e.g., 180, 190, FIG. 1) configured to supply a selected one of a first clock frequency (e.g., 178, FIG. 1) and a second clock frequency (e.g., 188, FIG. 1) to a digital circuit block of the imaging device; and wherein the imaging device is configured to subject the digital circuit block to dynamic frequency scaling within the one-frame operation such that the first clock frequency is supplied to the digital circuit block during the read period, and the second clock frequency is supplied to the digital circuit block during the V-blanking period (e.g., as shown in FIG. 2).

According to yet another example embodiment disclosed above, e.g., in the summary section and/or in reference to any one or any combination of some or all of FIGS. 1-5, provided is a method implemented in an imaging device, the method comprising the steps of: controlling, with an electronic controller, one-frame operation (e.g., $1_k$, $2_k$, $3_k$, $4_k$, FIG. 2) of the imaging device in response to a host command (e.g., 438, FIG. 4), the one-frame operation including at least a read period and a V-blanking period; selectively supplying, with a power-supply regulator (e.g., 104, 106, FIG. 1), a first non-zero voltage (e.g., Vdd1, FIG. 1) and a second non-zero voltage (e.g., Vdd2, FIG. 1) to a digital circuit block (e.g., 168, FIG. 1) of the imaging device; supplying, with one or more oscillators (e.g., 180, 190, FIG. 1), a selected one of a first clock frequency (e.g., 178, FIG. 1) and a second clock frequency (e.g., 188, FIG. 1) to the digital circuit block; and subjecting the digital circuit block to dynamic voltage and frequency scaling (DVFS) within the one-frame operation, said DVFS comprising supplying the first non-zero voltage and the first clock frequency to the digital circuit block during the read period, and supplying the second non-zero voltage and the second clock frequency to the digital circuit block during the V-blanking period (e.g., as shown in FIG. 2).

While this disclosure includes references to illustrative embodiments, this specification is not intended to be construed in a limiting sense. Various modifications of the described embodiments, as well as other embodiments within the scope of the disclosure, which are apparent to persons of ordinary skill in the art to which the disclosure pertains are deemed to lie within the scope of the disclosure, e.g., as expressed in the following claims.

Some embodiments may be implemented as circuit-based processes, including possible implementation on a single integrated circuit.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature and principles of this disclosure may be made by those skilled in the pertinent art without departing from the scope of the disclosure, e.g., as expressed in the following claims.

The use of figure numbers and/or figure reference labels (if any) in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine-readable (e.g., non-transitory) medium and so executed by a computer or processor, whether or not such computer or processor is explicitly shown.

"SUMMARY OF SOME SPECIFIC EMBODIMENTS" in this specification is intended to introduce some example embodiments, with additional embodiments being described in "DETAILED DESCRIPTION" and/or in reference to one or more drawings. "SUMMARY OF SOME SPECIFIC EMBODIMENTS" is not intended to identify essential elements or features of the claimed subject matter, nor is it intended to limit the scope of the claimed subject matter.

What is claimed is:

1. An apparatus, comprising an imaging device that comprises:
   an electronic controller configured to control one-frame operation of the imaging device in response to a host command, the one-frame operation including at least a read period and a V-blanking period; and
   a power-supply regulator configured to selectively supply a first non-zero voltage and a second non-zero voltage to a digital circuit block of the imaging device; and
   wherein the imaging device is configured to subject the digital circuit block to dynamic voltage scaling within the one-frame operation such that the first non-zero voltage is supplied to the digital circuit block during the read period, and the second non-zero voltage is supplied to the digital circuit block during the V-blanking period.

2. The apparatus of claim 1, wherein the power-supply regulator comprises a low-dropout regulator and a power gate connected in parallel to each other between a power-supply terminal of the imaging device and the digital circuit block.

3. The apparatus of claim 1, wherein the power-supply regulator is configured to cause an absolute value of the second non-zero voltage to be smaller than an absolute value of the first non-zero voltage.

4. The apparatus of claim 3,
   wherein the digital circuit block includes a static random-access memory (SRAM); and
   wherein the second non-zero voltage enables the SRAM to perform a data retention operation therein.

5. The apparatus of claim 4, wherein the second non-zero voltage is insufficient for the SRAM to perform a data read operation or a data write operation therein.

6. The apparatus of claim 1, further comprising one or more oscillators configured to supply a selected one of a first clock frequency and a second clock frequency to the digital circuit block; and
   wherein the imaging device is further configured to subject the digital circuit block to dynamic frequency scaling within the one-frame operation such that the first clock frequency is supplied to the digital circuit block during the read period, and the second clock frequency is supplied to the digital circuit block during the V-blanking period.

7. The apparatus of claim 6,
wherein the one-frame operation includes a shutter period; and
wherein the dynamic voltage scaling and the dynamic frequency scaling within the one-frame operation are configured to cause the first non-zero voltage and the first clock frequency to be supplied to the digital circuit block during the shutter period.

8. The apparatus of claim 6,
wherein the one-frame operation includes an exposure period; and
wherein the dynamic voltage scaling and the dynamic frequency scaling within the one-frame operation are configured to cause the first non-zero voltage and the first clock frequency to be supplied to the digital circuit block during the exposure period.

9. The apparatus of claim 6, wherein the one or more oscillators are configured to stop generating the first clock frequency during the V-blanking period.

10. The apparatus of claim 6, wherein a ratio of the first clock frequency and the second clock frequency is larger than 300.

11. The apparatus of claim 6, wherein the imaging device is configurable to operate in a selected one of a plurality of operating modes including a first mode and a different second mode, the first mode including a sequence of one-frame operations.

12. The apparatus of claim 11, wherein the power-supply regulator is configured to continuously supply the first non-zero voltage to the digital circuit block during the second mode.

13. The apparatus of claim 12, wherein the one or more oscillators are configured to continuously supply the first clock frequency to the digital circuit block during the second mode.

14. The apparatus of claim 11, wherein the one or more oscillators are configured to continuously supply the first clock frequency to the digital circuit block during the second mode.

15. The apparatus of claim 6,
wherein the imaging device further comprises a pixel array and an analog-to-digital-converter (ADC) circuit connected to the pixel array; and
wherein the one or more oscillators are configured to supply a third clock frequency to the ADC circuit, the third clock frequency being greater than the first clock frequency.

16. The apparatus of claim 15, wherein the third clock frequency is an integer multiple of the first frequency.

17. The apparatus of claim 15, wherein the one or more oscillators are configured to:
supply the third clock frequency to the ADC circuit during the read period; and
stop generating the third clock frequency during the V-blanking period.

18. The apparatus of claim 1, wherein the electronic controller includes the digital circuit block.

19. An apparatus, comprising an imaging device that comprises:
an electronic controller configured to control one-frame operation of the imaging device in response to a host command, the one-frame operation including at least a read period and a V-blanking period;
one or more oscillators configured to supply a selected one of a first clock frequency and a second clock frequency to a digital circuit block of the imaging device; and
wherein the imaging device is configured to subject the digital circuit block to dynamic frequency scaling within the one-frame operation such that the first clock frequency is supplied to the digital circuit block during the read period, and the second clock frequency is supplied to the digital circuit block during the V-blanking period.

20. A method implemented in an imaging device, the method comprising:
controlling, with an electronic controller, one-frame operation of the imaging device in response to a host command, the one-frame operation including at least a read period and a V-blanking period;
selectively supplying, with a power-supply regulator, a first non-zero voltage and a second non-zero voltage to a digital circuit block of the imaging device;
supplying, with one or more oscillators, a selected one of a first clock frequency and a second clock frequency to the digital circuit block; and
subjecting the digital circuit block to dynamic voltage and frequency scaling (DVFS) within the one-frame operation, said DVFS comprising supplying the first non-zero voltage and the first clock frequency to the digital circuit block during the read period, and supplying the second non-zero voltage and the second clock frequency to the digital circuit block during the V-blanking period.

* * * * *